May 10, 1932.   W. L. MARDEN   1,857,851
THRUST ROLLER PLATE CONSTRUCTION FOR FLUID METERS
Filed Jan. 2, 1931
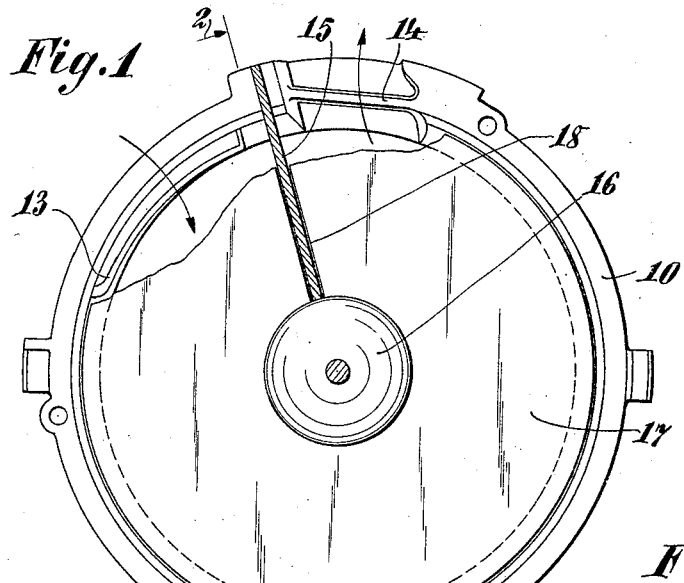
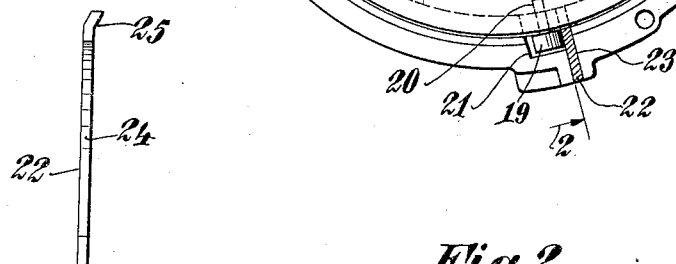
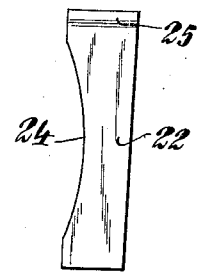
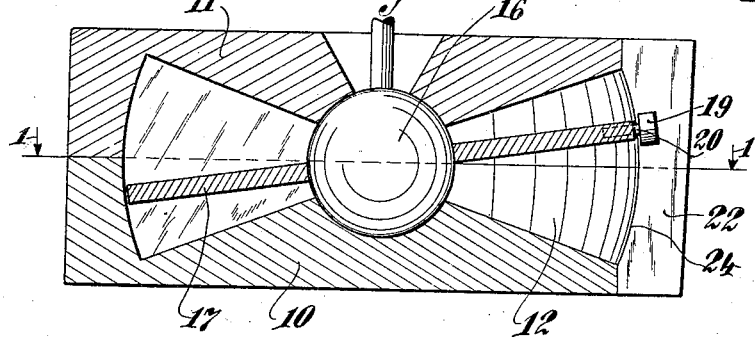
INVENTOR
William L. Marden,
BY
Redding, Greeley, O'Shea & Campbell
HIS ATTORNEYS Patented May 10, 1932

1,857,851

UNITED STATES PATENT OFFICE

WILLIAM L. MARDEN, OF ELMHURST, NEW YORK, ASSIGNOR TO NEPTUNE METER COMPANY, OF NEW YORK, N. Y., A CORPORATION OF NEW JERSEY

THRUST ROLLER PLATE CONSTRUCTION FOR FLUID METERS

Application filed January 2, 1931. Serial No. 506,160.

The present invention relates to fluid meters and embodies, more specifically, an improved thrust roller plate construction for meters of the disc piston type. More particularly, the invention embodies a thrust roller plate construction of such character as to enable the plate to be readily and effectively installed in the meter.

An object of the invention is to provide an improved thrust roller plate which is simple of construction and readily applied to the meter, the plate being secured in position in an easy and effective fashion without requiring difficult installing operations.

Further objects, not specifically enumerated above, will be apparent as the invention is described in greater detail in connection with the accompanying drawings, wherein:

Figure 1 is a view in section, taken on line 1—1 of Figure 2, and partly broken away, showing a meter constructed in accordance with the present invention, the top of the meter being removed to expose the disc piston and illustrate, more clearly, the thrust roller plate construction of the present invention.

Figure 2 is a view in section, taken on line 2—2 of Figure 1, and looking in the direction of the arrows.

Figure 3 is a detail view showing the thrust roller plate of the present invention.

Figure 4 is an end view of the thrust roller plate of Figure 3.

Referring to the above drawings, a meter housing is shown as comprising a bottom member 10 and a cooperating cover plate or top member 11. A chamber 12 of well known form is formed between the members and inlet port 13 and outlet port 14 are formed in the wall of the meter upon opposite sides of a partition 15.

A ball mounting 16 carries a disc piston 17 which is formed with a slot 18 to receive the partition 15, as will be clearly seen in Figure 1. The piston also carries a thrust roller 19 which is journaled upon a pin 20 and although the position of this roller is shown as aligned with the slot 18 in the disc 17, it will be apparent that it may be mounted at any desired location.

A groove 21 is formed in the meter housing and adapted to receive the roller 19, a thrust roller plate 22 being mounted within a slot 23, formed in the meter housing adjacent the groove 21. The construction is such that one side of the thrust plate forms a side of the groove 21 and it is upon this side that the thrust roller engages during operation. Fluid flow through the meter in the direction indicated by the arrows of Figure 1 tends to wabble the disc in an anti-clockwise direction. If the thrust roller were not provided, the thrust resulting from this tendency would cause considerable wear between the side of the slot 18 and the outlet side of partition 15. The provision of the thrust roller relieves these elements from such wear and reduces the resistance of the meter to fluid flow considerably.

The thrust roller plate is formed with a curved edge 24 and is adapted to lie flush with the arcuate walls of the chamber 12. A crimp 25 is formed at one end of the thrust plate and, when the plate is inserted in the slot 23, effectively grips the side of the slot to secure the plate in position. The outside of the plate lies flush with the outer side of the meter and thus is not readily removed and the above construction effectively secures the plate in position.

While the invention has been described with specific reference to the accompanying drawings, it is not to be limited, save as defined in the appended claims.

I claim as my invention:

1. In combination with a meter housing formed with a plane slot communicating with the interior of the housing and having a movable metering element therein, a thrust bearing carried by the movable element, and a thrust plate carried by the housing and formed with a yielding offset portion adapted to engage frictionally the plane slot in the housing.

2. In combination with a meter housing formed with a plane slot communicating with the interior of the housing and having a movable metering element therein, a thrust bearing carried by the movable element, and a thrust plate carried by the housing and formed with a crimp adapted to engaged the walls of the plane slot in the housing.

3. In combinating with a meter housing formed with a slot communicating with the interior of the housing and having a movable metering element therein, a thrust roller bearing carried by the movable element, and a thrust plate carried by the housing and formed with a crimp adapted to engage the walls of the slot in the housing.

4. As an article of manufacture, a thrust roller plate formed with edges adapted to lie flush with the inner wall of a metering chamber and the outer walls thereof and having a crimp adjacent one edge.

This specification signed this 29th day of December A. D. 1930.

WILLIAM L. MARDEN.